United States Patent
Lee (10) Patent No.: US 7,301,720 B2
(45) Date of Patent: Nov. 27, 2007

(54) METHOD OF DETERMINING AND APPLYING ADAPTIVE TRACK ZERO POSITION AND DISC DRIVE USING THE SAME

(75) Inventor: Seok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 215 days.

(21) Appl. No.: 10/947,437

(22) Filed: Sep. 23, 2004

(65) Prior Publication Data

US 2005/0073915 A1 Apr. 7, 2005

(30) Foreign Application Priority Data

Oct. 4, 2003 (KR) .................. 10-2003-0068994

(51) Int. Cl.
G11B 21/02 (2006.01)
G11B 5/596 (2006.01)

(52) U.S. Cl. .................. 360/75; 360/77.02; 360/78.04

(58) Field of Classification Search .................. None
See application file for complete search history.

(56) References Cited

U.S. PATENT DOCUMENTS

2005/0041321 A1* 2/2005 Settje et al. ............. 360/77.02

2005/0152253 A1* 7/2005 Park et al. ............. 369/53.25

FOREIGN PATENT DOCUMENTS

| JP | 07-249276 | 9/1995 |
|---|---|---|
| JP | 09-128915 | 5/1997 |
| JP | 09-330571 | 12/1997 |
| KR | 1998-702968 | 9/1998 |

\* cited by examiner

Primary Examiner—Andrew L. Sniezek
(74) Attorney, Agent, or Firm—Staas & Halsey LLP (57) ABSTRACT

A method of determining, and an apparatus to determine, a track zero position of a disc in a disc drive, the method including seeking, sequentially, in units of predetermined numbers of tracks, outwardly from a designed track zero position to a predetermined critical track position of the disc; determining whether track following is performed normally during the seeking; and determining an actual track zero position by shifting the designed track zero position inward by a predetermined number of tracks in response to the track following not performing normally, and determining the actual track zero position to be the designed track position in response to the track following performing normally.

17 Claims, 7 Drawing Sheets

ROTATIONAL PATH | PATH OF HEAD FOLLOWING SERVO INFORMAION

FIG. 7A   STW (GRAY CODE NUMBER): G0 G1 G2 G3 G4 G5 G6 G7 G8 G9 G10 G11 G12 G13

FIG. 7B   NO OCS CONTACT: 0GB D0 D1 D2 D3 D4 D5

FIG. 7C   OCS CONTACT: 0GB D0 D1 D2 D3

METHOD OF DETERMINING AND APPLYING ADAPTIVE TRACK ZERO POSITION AND DISC DRIVE USING THE SAME

CROSS-REFERENCE TO RELATED APPLICATIONS

This application claims the benefit of Korean Patent Application No. 2003-68994, filed Oct. 4, 2003, in the Korean Intellectual Property Office, the disclosure of which is incorporated herein by reference.

BACKGROUND OF THE INVENTION

1. Field of the Invention

The present invention relates to a data storage system and a method of controlling the same, and, more particularly, to a method of determining and applying an adaptive track zero position, and a disc drive using the same, in which a track zero position is adaptively determined to prevent an actuator arm from contacting an outer disc crash stop (OCS) by considering the eccentricity of a spindle motor shaft in regard to tracks of a disc in an offline servo track writing method.

2. Description of the Related Art

Generally, a hard disc drive is a type of data storage device that contributes to the operation of a system by reproducing data from a disc, or writing data on the disc, using a magnetic head. Recently, in hard disc drives, there has been a trend toward high capacity, high density, and miniaturization. In particular, there has been a trend toward a high recording bit density in a rotation direction (bits per inch, BPI) and in a radial direction (tracks per inch, TPI). Thus, a more sophisticated mechanism to control a hard disc drive is needed.

Related techniques are disclosed in Japanese Patent Publication Nos. 1997-330571 and 1997-128915.

Japanese Patent Publication No. 1997-330571 teaches a method in which an eccentricity is compensated for by measuring a path of rotation of a spindle motor of a disc drive. Japanese Patent Publication No. 1997-128915 teaches a method in which information about an eccentricity with respect to a center of rotation of a disc is stored in a table and then utilized for compensation.

Figure 1:
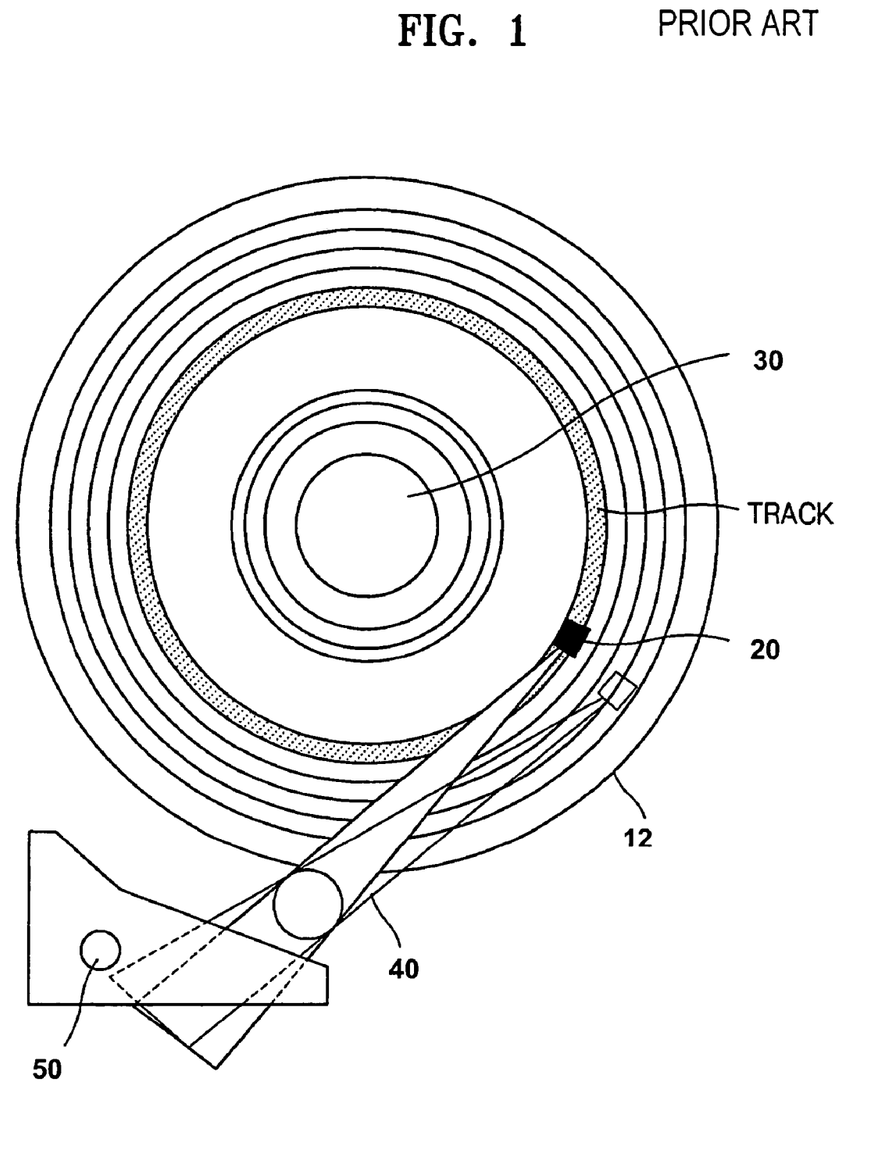
FIG. 1 is a top view of various physical components of a hard disc assembly of a disc drive.

A hard disc drive includes a hard disc assembly (HDA) 10, and a PCB assembly involved in reading and writing operations by controlling the HDA 10. The HDA 10, as shown in FIG. 1, includes a disc 12, a head 20 that writes/reads information on/from the disc 12, a spindle motor 30 that rotates the disc 12, an actuator arm 40 that moves the head 20, a voice coil motor (VCM, not shown), and an outer disc crash stop (OCS) 50 that restricts a displacement of the actuator arm 40.

The OCS 50 is a kind of shock absorber to prevent the head 20 from moving to a non-writable position of the disc 12.

Servo information used to control the head 20 is concentrically recorded on each track of the disc 12 from an outer circumference to an inner circumference of the disc 12. Actually, tracks on which user information is written do not start at a first track, which contains the servo information, but begin with a track that is far from the first track toward the inner circumference of the disc 12, considering a seek overshoot. The section between the physical first track and the actual first track on which the user information is written is called an outer guard band (OGB). Typically, a track 0 (zero) indicates the first track on which the user information can be written. The track number increases from track 0 toward the inner circumference of the disc 12.

The higher the density of the hard disc 12, the more tracks it has, and the more time is consumed by a writing process performed during assembly of the hard disc drive.

To address the problem of the lengthy writing process, a method of assembling a disc drive in which the servo information is written on a hard disc 12 in advance during a manufacturing process has been suggested.

Recording of the servo information onto the disc 12 is referred to as servo track writing (STW), and the method of assembling a disc drive in which the servo information is written on the hard disc 12 in advance during the manufacturing process is called an offline servo track writing (Offline STW) method.

During assembly of the hard disc drive in the Offline STW method, if the center of the disc 12 does not exactly correspond to the axis of rotation of a spindle motor, there may be a difference between a path across the rotating disc 12 of a head 20 following the servo information and an actual rotational path of the disc 12, because the servo information is not written based on the spindle motor 30 operation, but based on the disc 12 operation. The difference of those rotational paths appears in the form of repeatable run out (RRO), which may affect a servo controller as a disturbance, thereby causing a position error signal (PES) to grow abnormally large. In addition, if the difference between the centers of the disc and the rotation axis of the spindle motor is too large, the actuator arm 40 may contact the OCS 50 while following tracks near the outer circumference of the disc 12, thereby causing interference that prevents normal tracking.

SUMMARY OF THE INVENTION

The present invention provides a method of determining and applying an adaptive track zero position and a disc drive using the same, in which the track zero (0) position is optimized according to eccentricity between centers of a disc and a spindle motor of the disc drive in an Offline servo track writing method.

Additional aspects and/or advantages of the invention will be set forth in part in the description which follows and, in part, will be obvious from the description, or may be learned by practice of the invention.

According to an aspect of the present invention, there is provided a method of determining a track zero position of a disc in a disc drive, the method comprising seeking, sequentially, in units of predetermined numbers of tracks, outwardly from a designed track zero position to a predetermined critical track position of the disc; determining whether track following is performed normally during the seeking; and determining an actual track zero position by shifting the designed track zero position inward by a predetermined number of tracks in response to the track following not performing normally, and determining the actual track zero position to be the designed track position in response to the track following performing normally.

The predetermined critical track position may be within an outer guard band.

The predetermined critical track position may be a first track on which servo information is written.

The method may be performed in a head disc assembly performance test process.

The method may further comprise storing information regarding the actual track zero position in a predetermined area of the disc.

The method may further comprise applying information regarding the actual track zero position in estimating a target track number during the seeking.

According to another aspect of the present invention, there is provided a method of determining and applying a track zero position of a disc in a disc drive, the method comprising seeking, sequentially, in units of predetermined numbers of tracks, outwardly from a designed track zero position to a predetermined critical track position of the disc; determining whether track following is performed normally during the seeking; generating information regarding a corrected track zero position in response to the track following not performing normally, the corrected track zero position being located a predetermined number of tracks inward from the designed track zero position; storing the information regarding the corrected track zero position in a predetermined area of the disc; using a gray code number to read out the information regarding the corrected track zero position in response to the disc drive being initialized during a burn-in test process; and adjusting an actual track zero position according to the information regarding the corrected track zero position.

According to still another aspect of the present invention, there is provided a method of determining and applying a track zero position of a disc in a disc drive, the method comprising seeking, sequentially, in units of predetermined numbers of tracks, outwardly from a designed track zero position to a predetermined critical track position of the disc; determining whether track following is performed normally during the seeking; generating information regarding a corrected track zero position in response to the track following not performing normally, the corrected track zero position being located a predetermined number of tracks inward from the designed track zero position; storing the information regarding the corrected track zero position in a flash memory; reading out the information regarding the corrected track zero position in response to the disc drive being initialized; and adjusting an actual track zero position according to the information regarding the corrected track zero position.

According to yet another aspect of the present invention, there is provided a disc drive comprising a host interface to communicate with a host device; a memory to store information regarding a corrected track zero position of a disc, the information being generated by adaptively correcting a designed track zero position; a buffer to store data received from the host device via the host interface or reproduced from the disc; a controller to control the disc drive according to instructions received from the host device, read the information regarding the corrected track zero position from the memory in response to the disc drive being initialized, adjust an actual track zero position according to the corrected track zero position, and control the disc drive to execute a track seeking servo according to the adjusted actual track zero position; and a read/write circuit to read data from the disc to be processed and stored in the buffer, and to read data from the buffer to be written on the disc.

The memory may be a flash memory.

Adaptively correcting the track zero position may comprise seeking, sequentially, in units of predetermined numbers of tracks, outwardly from the designed track zero position to a predetermined critical track position of the disc; determining whether track following is performed normally during the seeking; generating the information regarding the corrected track zero position in response to the track following not being performed normally, the corrected track zero position being located a predetermined number of tracks inward from the designed track zero position.

BRIEF DESCRIPTION OF THE DRAWINGS

These and/or other aspects and advantages of the invention will become apparent and more readily appreciated from the following describing of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
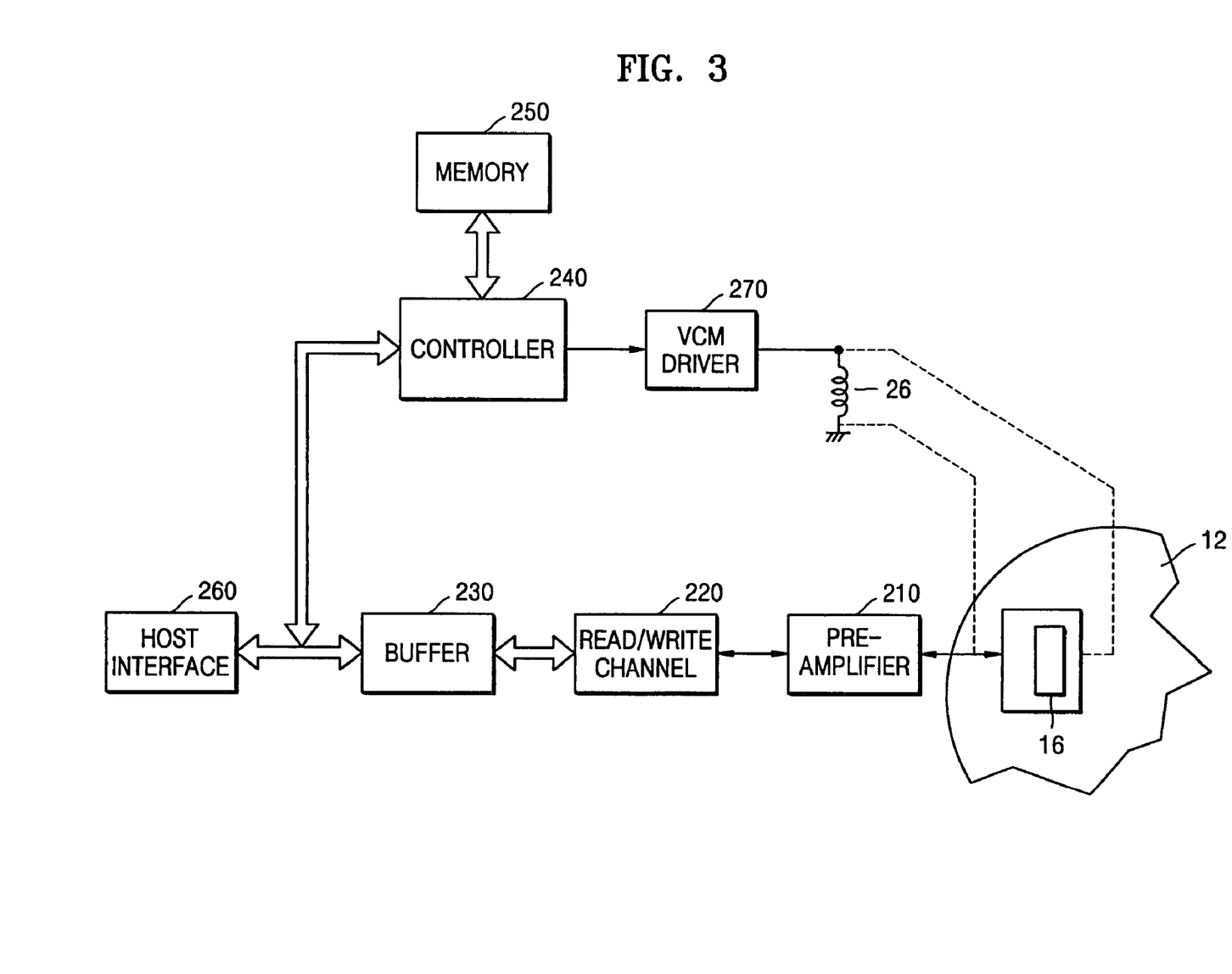
FIG. 3 illustrates components of a disc drive according to an embodiment of the present invention.

FIG. 3 illustrates components of a disc drive according to an embodiment of the present invention.

Referring to FIG. 3, the disc drive includes a disc 12, a transducer 16, a pre-amplifier 210, a write/read channel 220, a buffer 230, a controller 240, a memory 250, and a host interface 260.

The disc 12 is formed with circular tracks, and each of the tracks has a plurality of sectors. Each sector includes a data field and an identification field. The identification field is comprised of gray codes, called servo information, that identify a corresponding sector and track (or cylinder).

The pre-amplifier 210 and the write/read channel 220 together may be referred to as a write/read circuit.

The memory 250 stores various programs to control the disc drive and data, and, in particular, stores information about a corrected track zero position and a designed track zero position, the corrected track zero position being determined according to an embodiment of the present invention as will be described later. The memory 250 may be a volatile flash memory.

Figure 2A:
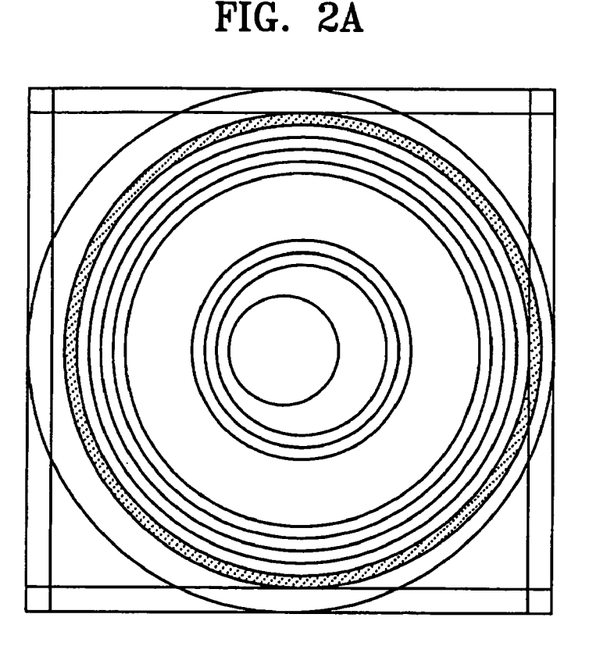
FIGS. 2A and 2B illustrate examples of an actual rotating path of a disc and a path of a head following servo information in an Offline servo track writing method.
Figure 2B:
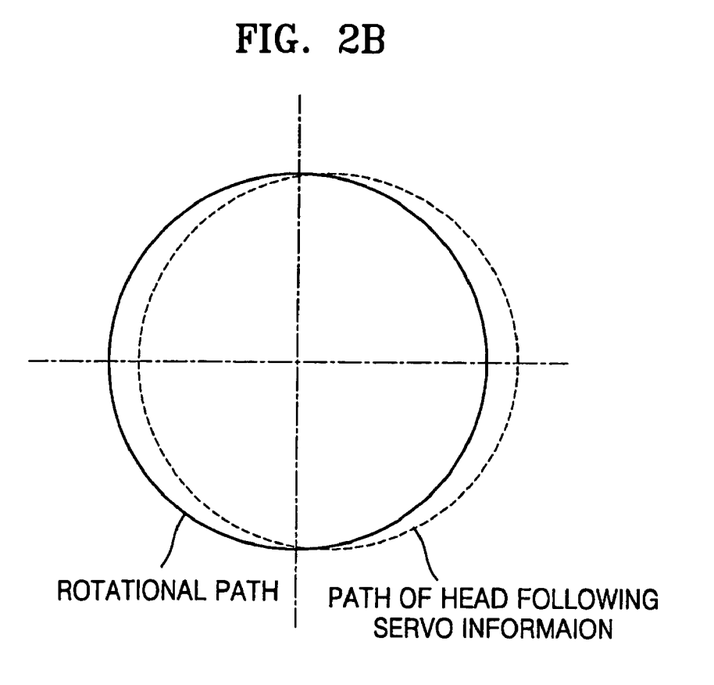

First, operation of the disc drive will now be described with reference to FIGS. 2A and 2B. FIGS. 2A and 2B illustrate examples of an actual rotating path of a disc and a path of a head 20 following servo information in an Offline servo track writing method.

In a data read mode of the disc drive, the pre-amplifier 210 amplifies an electrical signal detected by the transducer 16 (called a head) from the disc 12 to enable signal processing afterwards. Then, the write/read channel 220 encodes the amplified analog signal into a corresponding digital signal for a host device (not shown) to be able to read, and further converts the encoded signal into stream data. The buffer 230 stores the stream data temporarily and forwards it to the host device via the host interface 260.

Meanwhile, in a data write mode of the disc drive, the host interface 260 receives data from the host device. The buffer 230 temporarily stores and sequentially outputs the data. The write/read channel 220 converts the data output by the buffer 230 into binary data streams to be written on the disc 12. The binary data streams are amplified by the pre-amplifier 210, and then written on the disc 12 by the transducer 16.

The controller 240 interprets instructions received from the host device via the host interface 260, and controls the disc drive according to the interpreted instructions. In particular, when the disc drive is initialized in a main process or by a user, the controller 240 reads out information about the corrected track zero position from the memory 250, and then applies the corrected track zero position to adjust the designed track zero position. Also, the controller 240 controls the disc drive to seek tracks using the adjusted track zero position.

In addition, when the disc drive is initialized in a burn in test process, the controller 240 reads the information regarding the corrected track zero position from a track corresponding to a predetermined gray code number, and then applies the corrected track zero position to adjust the designed track zero position.

Figure 4:
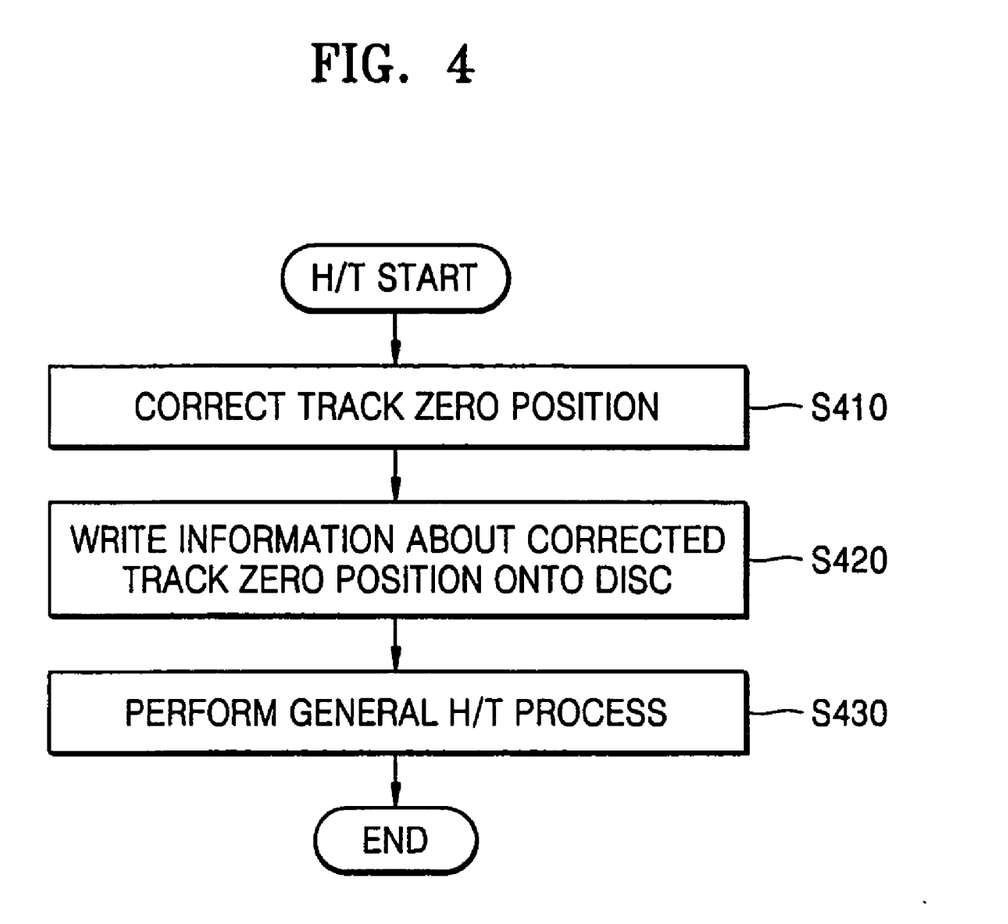
FIG. 4 is a flowchart illustrating a method of determining a track zero position according to an embodiment of the present invention.

A method of determining an adaptive track zero position according to an embodiment of the present invention will now be described with reference to FIG. 4.

The method may be performed at the beginning of a head disc assembly performance test process as described below.

First, in operation S410, a process of adjusting the track zero position is performed. This process will now be described in detail with reference to FIG. 5.

Figure 5:
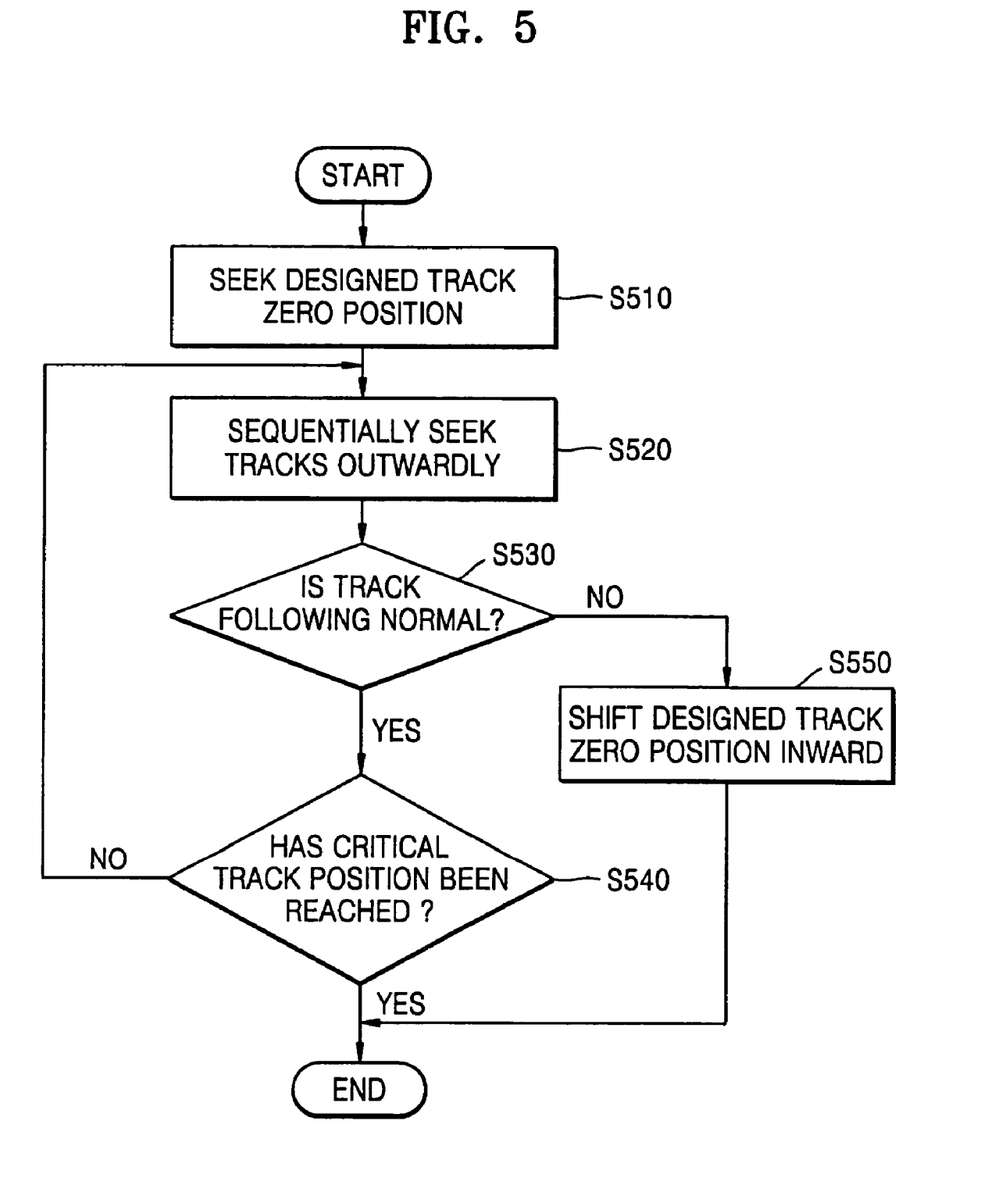
FIG. 5 is a flowchart illustrating in more detail an operation of correcting a track zero position in the method shown in FIG. 4.

Referring to FIG. 5, the controller 240 controls the disc drive to seek an initial track zero position that is the designed track zero position in operation S510.

Next, the controller 240 controls the disc drive to sequentially seek tracks outwardly from the designed track zero position in operation S520. That is, the controller 240 controls the disc drive to perform the seek operation in units of predetermined numbers of tracks, outwardly from the inner circumference, of an outside guard band (OGB).

In operation S530, the controller 240 determines whether a track following is being performed normally while performing the seek operation. The controller 240 can determine whether the track following is performed normally by checking the normality of a position error signal, and, if necessary, by reading a gray code to identify a target track.

If the controller 240 determines in operation S530 that the track following is performed normally, the controller 240 determines whether a current transducer 16 reaches a critical track position in operation S540. The critical track position can be set within the outer guard band considering a design margin.

If the controller 240 determines in operation S540 that the current transducer 16 has not reached the critical track position, the controller 240 goes back to perform operation S520 again, and if it is determined in operation S540 that the current transducer 16 has reached the critical track position in operation S540, the controller 240 finishes performing this method.

If the controller 240 determines in operation S530 that the track following is not being performed normally, the controller 240 generates information regarding a corrected track zero position that is shifted inward from the designed track zero position in operation S550.

Abnormal track following occurs when the actuator arm 40 contacts with the OCS 50 so that it cannot move further outward. In this case, the controller 240 needs to control the actuator arm 40 so as not to contact with the OCS 50 by shifting the track zero position inward by a predetermined amount according to the corrected track zero position.

Figure 7A:
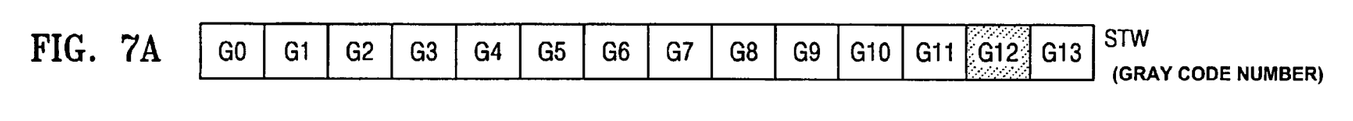
FIG. 7A illustrates a track on which gray codes are written.

For example, it can be assumed that the designed track zero position is initially set to correspond to a gray code number G8 among the servo track written gray code numbers shown in FIG. 7A.

Figure 7B:
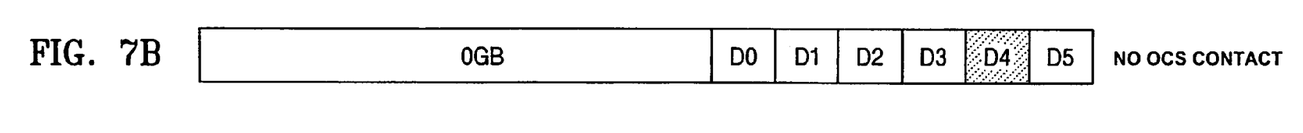
FIG. 7B illustrates a track and a track zero position when an actuator arm does not contact an outer disc crash stop (OCS)

If the actuator arm 40 does not contact with the OCS 50, there is no need to correct an actual track zero position, so the designed track zero position G8 is maintained as the actual track zero position as shown in FIG. 7B.

Figure 7C:
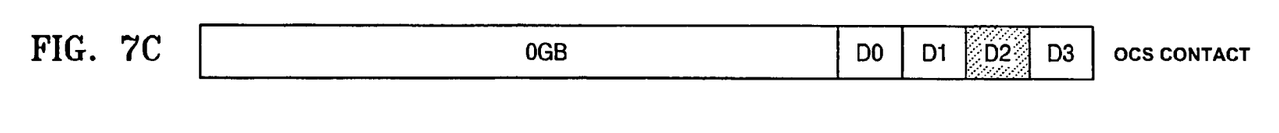
FIG. 7C illustrates a track and a corrected track zero position when an actuator arm does contact an outer disc crash stop (OCS)

Conversely, if the actuator arm 40 does make contact with the OCS, the controller 240 generates information regarding the corrected track zero position, e.g., an amount such as 2, to be added to the designed track zero position, and thereby the actual track zero position then corresponds accordingly to a gray code number G10, as shown in FIG. 7C.

Figure 8A:
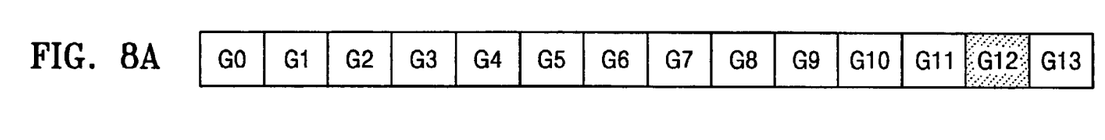
FIGS. 8A and 8B illustrate examples of a track on which gray codes are written, and a track having a track zero position set by one of the gray codes.
Figure 8B:
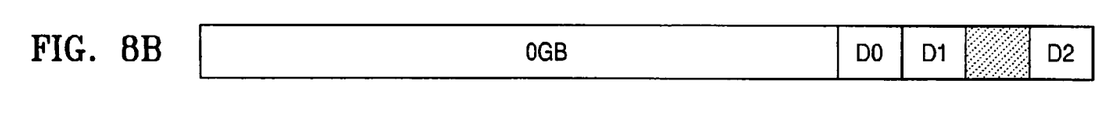

Referring back to FIG. 4, after the process of correcting the track zero position as described above, the controller 240 writes the information about the corrected track zero position to a predetermined area of the disc in operation S420. The predetermined area is a sector of a track corresponding to a predetermined gray code number set by a design specification. An example of the predetermined gray code number G12 is shown in FIG. 8A. The track corresponding to the predetermined gray code number G12 is designed not to have user data written in an area identified by G12, as shown in FIG. 8B.

After that, the controller 240 performs a general head disc assembly performance test (H/T) in operation S430.

Figure 6:
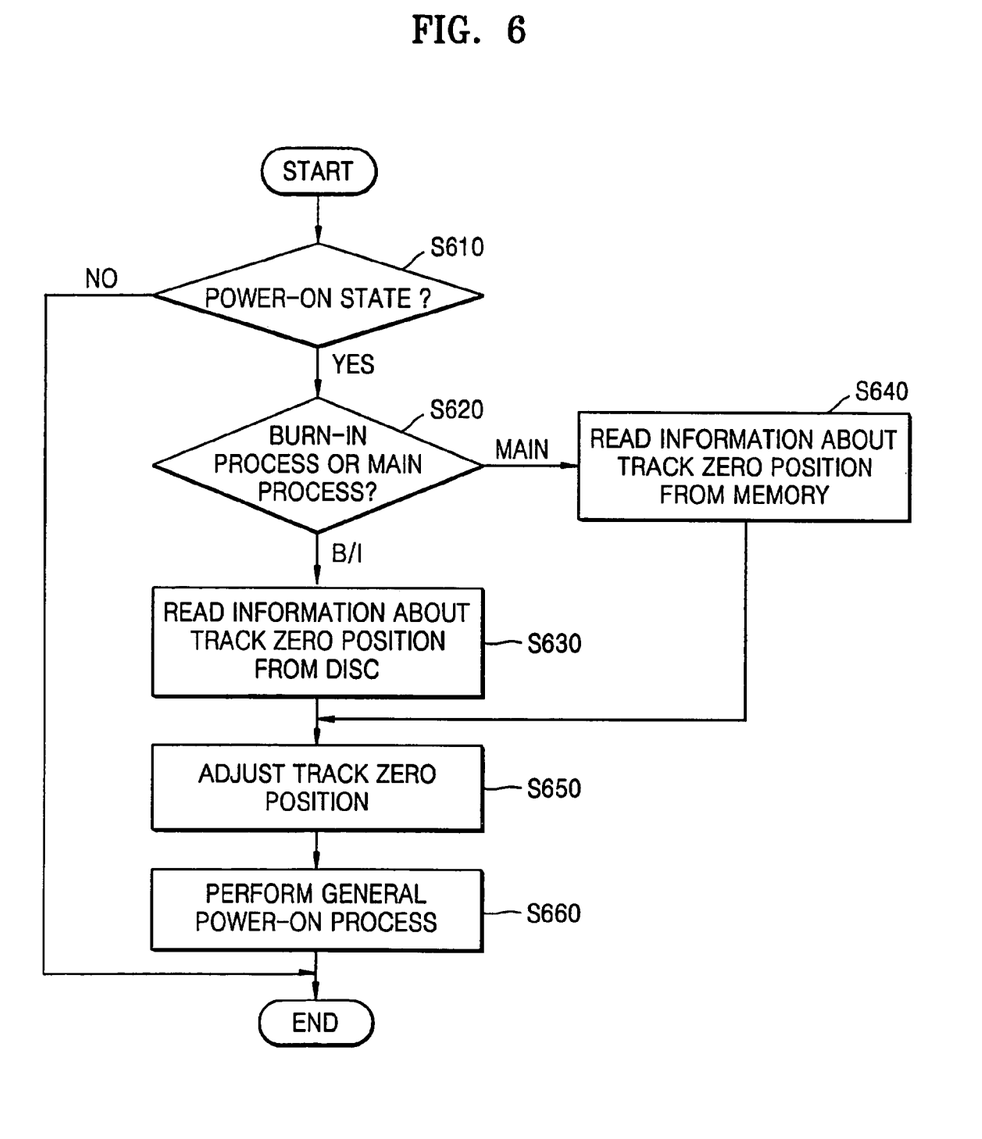
FIG. 6 is a flowchart illustrating a method of determining and applying a track zero position according to an embodiment of the present invention.

A method of adjusting the track zero position using the information regarding the corrected track zero position will now be described with reference to FIG. 6.

Adjusting of the track zero position is performed whenever the disc drive is initialized. Since the disc drive is initialized whenever it is switched from a power-off state into a power-on state, the controller 240 detects whether the disc drive is changed into the power-on state in operation S610.

If the disc 12 is switched into the power-on state in operation S610, the controller 240 determines whether a current process corresponds to the burn-in process or the main process in operation S620.

If the current process corresponds to the burn-in process, the controller 240 reads out the information regarding the corrected track zero from the disc 12 using the predetermined gray code number. The predetermined gray code number is an initial value set in advance. The information regarding the corrected track zero is arranged to be stored on a track and sector corresponding to the predetermined gray code number, and then to be read out when the disc drive is initialized during the burn-in process.

Meanwhile, if the controller determines in operation S620 that the current process is the main process, the controller 240 reads out the information about the corrected track zero position from the memory 250 in operation S640.

After reading the information about the corrected track zero position, the controller 240 adjusts a current track zero position according to the corrected track zero position in operation S650. At this time, if there is any information regarding the corrected track zero position, the controller 240 shifts the current track zero position inward by a number of tracks corresponding to the information regarding the corrected track zero position. If there is no information about the corrected track zero position, the controller 240 maintains the current track zero position, which is generally the designed track zero position.

Next, the controller 240 executes the disc drive initialize process in operation S660, which is performed in the general power-on state.

According to this method, even if there is eccentricity between the disc and the spindle motor of the disc drive, the track zero position is adaptively adjusted so that the actuator arm does not to contact with the OCS.

As described above, according to the present invention, by adaptively determining and applying the track zero position in the disc drive employing the offline servo track writing method, the actuator arm can be prevented from contacting the OCS even when there is eccentricity between the center of rotation of the disc and a center line of a track defined by servo information, thereby improving performance of the disc drive.

It is understood that an embodiment of the present invention may be used and/or controlled by a machine-readable medium on which is stored a set of instructions (i.e., software) embodying any one, or all, of the embodiments described herein. The machine-readable medium may include permanent or removable storage, such as magnetic and optical discs, RAM, ROM, a carrier wave medium, etc., on which the process and data structures of the present invention can be stored and distributed. The operations can also be distributed via, for example, downloading over a network such as the Internet.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of determining a track zero position of a disc in a disc drive, the method comprising:
   seeking, sequentially, in units of predetermined numbers of tracks, outwardly from a designed track zero position to a predetermined critical track position of the disc;
   determining whether track following is performed normally during the seeking; and
   determining an actual track zero position by shifting the designed track zero position inward by a predetermined number of tracks in response to the track following not performing normally, and determining the actual track zero position to be the designed track position in response to the track following performing normally.

2. The method of claim 1, wherein the predetermined critical track position is within an outer guard band.

3. The method of claim 1, wherein the predetermined critical track position is a first track on which servo information is written.

4. The method of claim 1, wherein the method is performed in a head disc assembly performance test process.

5. The method of claim 1, further comprising storing information regarding the actual track zero position in a predetermined area of the disc.

6. The method of claim 5, wherein the predetermined area of the disc is a track corresponding to a predetermined gray code number.

7. The method of claim 1, further comprising applying information regarding the actual track zero position in estimating a target track number during the seeking.

8. The method of claim 1, wherein the determining whether the track following is performed normally comprises checking the normality of a position error signal.

9. The method of claim 8, wherein the determining whether the track following is performed normally further comprises reading a gray code number to identify a target track.

10. A computer-readable medium comprising computer-readable code to control a computer to determine a track zero position of a disc in a disc drive by implementing the method of claim 1.

11. A method of determining and applying a track zero position of a disc in a disc drive, the method comprising:
   seeking, sequentially, in units of predetermined numbers of tracks, outwardly from a designed track zero position to a predetermined critical track position of the disc;
   determining whether track following is performed normally during the seeking;
   generating information regarding a corrected track zero position in response to the track following not performing normally, the corrected track zero position being located a predetermined number of tracks inward from the designed track zero position;
   storing the information regarding the corrected track zero position in a predetermined area of the disc;
   using a gray code number to read out the information regarding the corrected track zero position in response to the disc drive being initialized during a burn-in test process; and
   adjusting an actual track zero position according to the information regarding the corrected track zero position.

12. A computer-readable medium comprising computer-readable code to control a computer to determine a track zero position of a disc in a disc drive by implementing the method of claim 11.

13. A method of determining and applying a track zero position of a disc in a disc drive, the method comprising:
   seeking, sequentially, in units of predetermined numbers of tracks, outwardly from a designed track zero position to a predetermined critical track position of the disc;
   determining whether track following is performed normally during the seeking;
   generating information regarding a corrected track zero position in response to the track following not performing normally, the corrected track zero position being located a predetermined number of tracks inward from the designed track zero position;
   storing the information regarding the corrected track zero position in a flash memory;

reading out the information regarding the corrected track zero position in response to the disc drive being initialized; and adjusting an actual track zero position according to the information regarding the corrected track zero position.

14. A computer-readable medium comprising computer-readable code to control a computer to determine a track zero position of a disc in a disc drive by implementing the method of claim 13.

15. A disc drive comprising:
a host interface to communicate with a host device;
a memory to store information regarding a corrected track zero position of a disc, the information being generated by adaptively correcting a designed track zero position;
a buffer to store data received from the host device via the host interface or reproduced from the disc;
a controller to control the disc drive according to instructions received from the host device, read the information regarding the corrected track zero position from the memory in response to the disc drive being initialized, adjust an actual track zero position according to the corrected track zero position, and control the disc drive to execute a track seeking servo according to the adjusted actual track zero position; and
a read/write circuit to read data from the disc to be processed and stored in the buffer, and to read data from the buffer to be written on the disc.

16. The disc drive of claim 15, wherein the memory is a flash memory.

17. The disc drive of claim 15, wherein the adaptively correcting the track zero position comprises:
seeking, sequentially, in units of predetermined numbers of tracks, outwardly from the designed track zero position to a predetermined critical track position of the disc;
determining whether track following is performed normally during the seeking; and
generating the information regarding the corrected track zero position in response to the track following not being performed normally, the corrected track zero position being located a predetermined number of tracks inward from the designed track zero position.

* * * * *